US008810711B2

(12) United States Patent
Maezawa

(10) Patent No.: US 8,810,711 B2
(45) Date of Patent: Aug. 19, 2014

(54) CATADIOPTRIC OPTICAL SYSTEM AND IMAGE PICKUP APPARATUS HAVING THE SAME

(75) Inventor: Koji Maezawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 12 days.

(21) Appl. No.: 13/558,522

(22) Filed: Jul. 26, 2012

(65) Prior Publication Data

US 2013/0027603 A1 Jan. 31, 2013

(30) Foreign Application Priority Data

Jul. 28, 2011 (JP) ................. 2011-165389

(51) Int. Cl.
*H04N 5/225* (2006.01)
*G02B 11/00* (2006.01)

(52) U.S. Cl.
USPC .......................................... 348/335; 359/362

(58) Field of Classification Search
None
See application file for complete search history.

(56) References Cited

U.S. PATENT DOCUMENTS

| 6,639,734 B2 * | 10/2003 | Omura .......................... 359/730 |
| 2004/0240047 A1 * | 12/2004 | Shafer et al. .................. 359/366 |
| 2005/0179994 A1 * | 8/2005 | Webb ............................ 359/352 |

FOREIGN PATENT DOCUMENTS

| JP | 53-112759 A | 10/1978 |
| JP | 2007-514179 A | 5/2007 |
| WO | 00/39623 A1 | 7/2000 |

\* cited by examiner

*Primary Examiner* — Twyler Haskins
*Assistant Examiner* — Angel L Garces-Rivera
(74) *Attorney, Agent, or Firm* — Rossi, Kimms & McDowell LLP

(57) ABSTRACT

A catadioptric optical system of the present invention includes a first imaging optical system that collects a light beam from an object, and a second imaging optical system including a refractive portion that forms an intermediate image by receiving a light beam from the first imaging optical system and to form an image of the intermediate image on an image plane, the first imaging optical system includes a first optical element and a second optical element, a reflection surface of the reflective portion of the first optical element and a reflection surface of the reflective portion of the second optical element are disposed so as to face each other, and an aperture stop is disposed between the first optical element and the second optical element.

11 Claims, 10 Drawing Sheets

CATADIOPTRIC OPTICAL SYSTEM AND IMAGE PICKUP APPARATUS HAVING THE SAME

BACKGROUND OF THE INVENTION

1. Field of the Invention

The present invention relates to a catadioptric optical system suitable for magnifying and observing a sample (an object), and an image pickup apparatus having the catadioptric optical system.

2. Description of the Related Art

In a current pathological examination, a pathological sample (a sample) is directly observed by a human eye using an optical microscope. Recently, a so-called virtual microscope in which the pathological sample is obtained as image data to be observed on a display is used. In the virtual microscope, since the image data of the pathological sample can be observed on the display, it can be observed by more than one person at the same time. In addition, using this virtual microscope, there are a lot of advantages that the image data is shared with a distant pathologist to seek the diagnosis or the like. However, there is a problem that this method takes time in order to take an image of the pathological sample to be obtained as image data.

One of reasons that the method takes time is that the pathological sample with a wide image-pickup range needs to be obtained as image data using a narrow image-pickup range of the microscope. When the image-pickup range of the microscope is narrow, taking the image more than once or connecting images while scanning the pathological sample is needed to obtain one image. In order to reduce the time that needs to obtain the image data while decreasing the number of times of taking the image compared to a conventional method, an optical system (an image pickup optical system) with a wide image-pickup range is required.

Additionally, in observing the pathological sample, an optical system that has a high resolution in a visible range (a wide wavelength range) as well as the wide image-pickup range is required. The optical system with a high resolution is required in a variety of fields, as well as the usage of the pathological diagnosis. Japanese Patent Publication No. S60-034737 discloses an objective lens of a microscope that is suitable for observing a living cell or the like in which an aberration is appropriately reduced over an entire range of visible light.

Japanese Translation of PCT Application No. 2007-514179 discloses a ultrawideband-ultraviolet microscope video system that has a high resolution over a wide wavelength range of ultraviolet using a catadioptric optical system in order to examine a defect that exists on an integrated circuit or a photomask. International Publication No. WO00/039623 discloses a catadioptric optical system that is suitable for exposing a fine pattern in a wide range to manufacture a semiconductor device.

There is a catadioptric optical system that is configured by combining a catoptric optical system with a dioptric optical system as an optical system that is suitable for appropriately reducing the aberration over the entire range of visible light. In this catadioptric optical system, using a phenomenon that the effect on Petzval sum for a surface shape is opposite between a reflective surface and a refractive surface, the aberration is appropriately reduced over the entire range of the visible light while a compact optical system is achieved by combining a concave reflection surface and a convex lens that have a light collection function.

In this catadioptric optical system, a wide observation range and a high optical performance over a wide wavelength range are required to observe a magnified sample.

In many catadioptric optical systems, an aperture stop that limits a marginal portion of a light beam in an optical path in the optical system is provided in order to set the numerical aperture of the optical system and set an entrance pupil and an exit pupil. In order to obtain a wide observation field of view, and a wide entire field of view and a high optical performance over the entire field of view in the catadioptric optical system, it is important that a position on an optical axis of the aperture stop that limits the light beam is arranged at an appropriate position. If the position of the aperture stop is inappropriate, it is difficult to appropriately limit a diameter of the light beam that enters an entire screen, and therefore it is difficult to obtain the high optical performance because of the increase of flare.

SUMMARY OF THE INVENTION

A catadioptric optical system as one aspect of the present invention includes a first imaging optical system configured to collect light beam from an object, and a second imaging optical system including a refractive portion configured to form an intermediate image by receiving a light beam from the first imaging optical system and to form an image of the intermediate image on an image plane, the first imaging optical system includes a first optical element that has a light transmissive portion provided on a periphery of an optical axis and a reflective portion provided on a surface at an object side of an outer circumferential side compared to the light transmissive portion, and a second optical element that has a light transmissive portion provided on the periphery of the optical axis and a reflective portion provided on a surface at an image side of an outer circumferential side compared to the light transmissive portion, a reflection surface of the reflective portion of the first optical element and a reflection surface of the reflective portion of the second optical element are disposed so as to face each other, the light beam from the object emits to the second imaging optical system after passing through, in order, the light transmissive portion of the first optical element, the reflective portion of the second optical element, the reflective portion of the first optical element, and the light transmissive portion of the second optical element, and an aperture stop is disposed between the first optical element and the second optical element.

DESCRIPTION OF THE PREFERRED EMBODIMENTS

Figure 1:
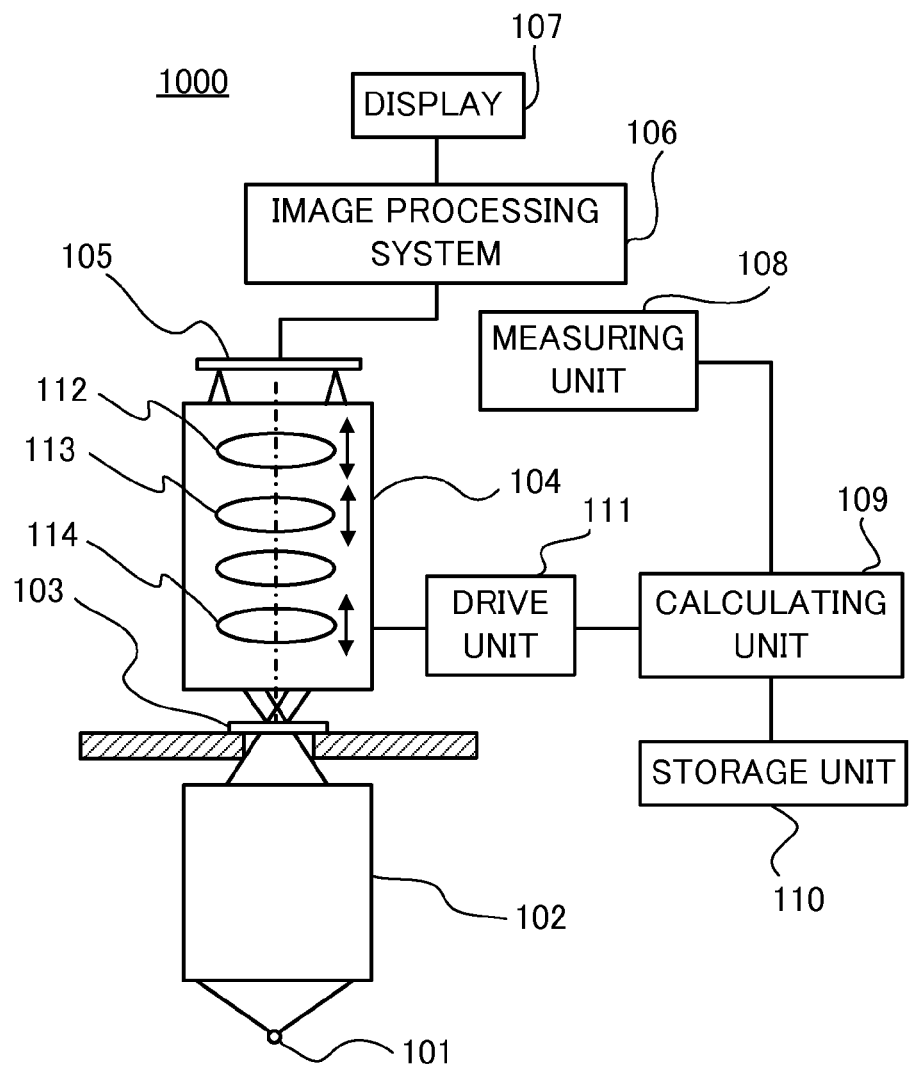
FIG. 1 is a schematic cross-sectional diagram of an image pickup apparatus in embodiments of the present invention.

Exemplary embodiments of the present invention will be described below with reference to the accompanied drawings.

An image pickup apparatus 1000 includes a light source 101, an illumination optical system 102 that illuminates an object 103 using a light beam from the light source 101, and a catadioptric optical system 104 that forms an image of the object 103. Furthermore, it includes an image pickup element 105 that performs a photoelectric conversion of an object image that is formed by the catadioptric optical system 104, an image processing system 106 that generates image information based on data obtained from the image pickup element 105, and a display 107 that displays image data generated by the image processing system 106.

It also includes a storage unit 110 that previously stores data relating to moving amounts of at least three lenses and aberration variations, and a temperature measuring unit 108 that measures a temperature of an environment where the catadioptric optical system is disposed. In addition, it includes a calculating unit 109 that calculates moving amounts for correcting the aberration variations that are generated by the environment change of at least three lens components. Furthermore, it includes a drive unit 111 that can move at least three lens components using the calculated moving amounts by the calculating unit 109.

Figure 2:
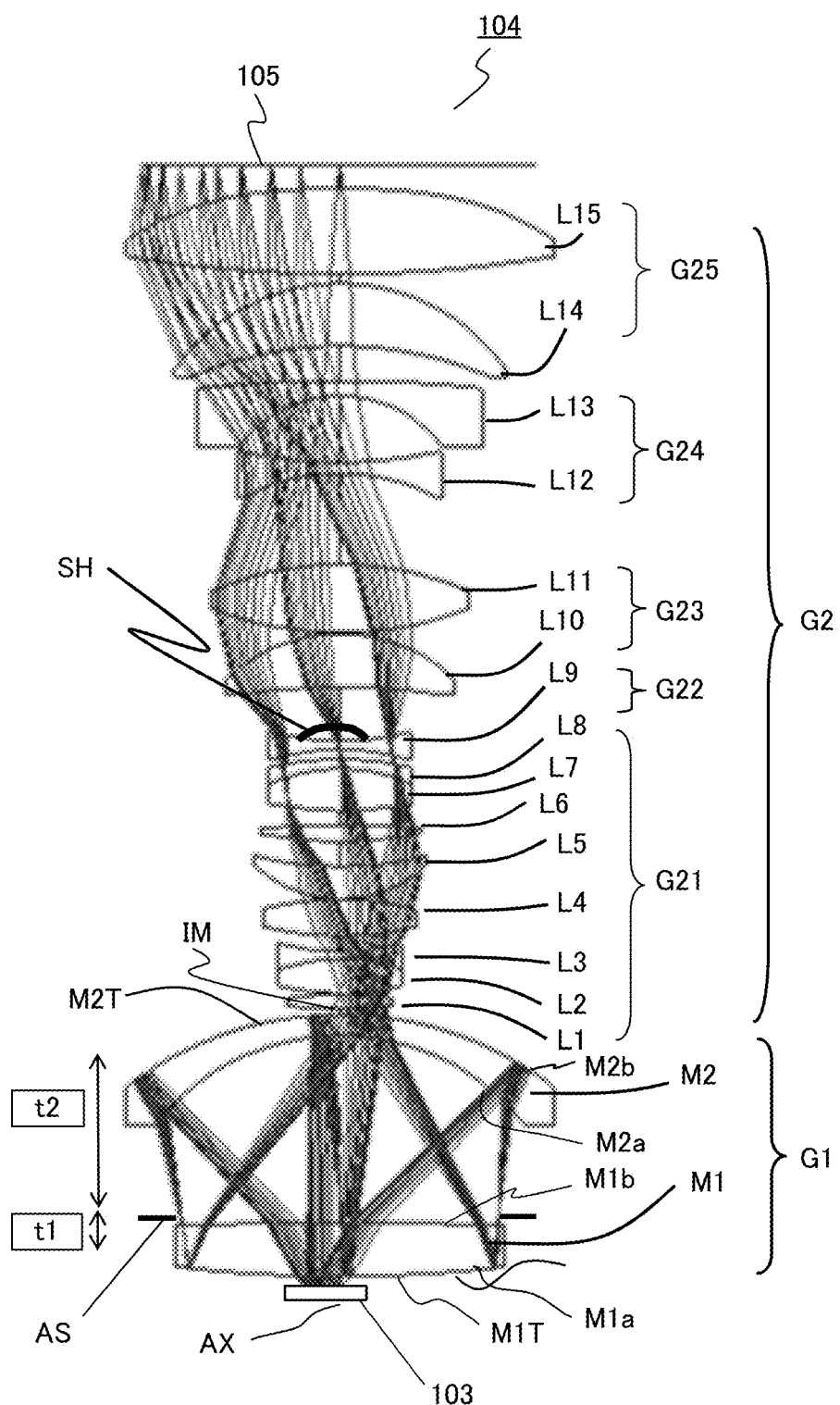
FIG. 2 is a schematic diagram of lenses of a catadioptric optical system in Embodiment 1 of the present invention.
Figure 3:
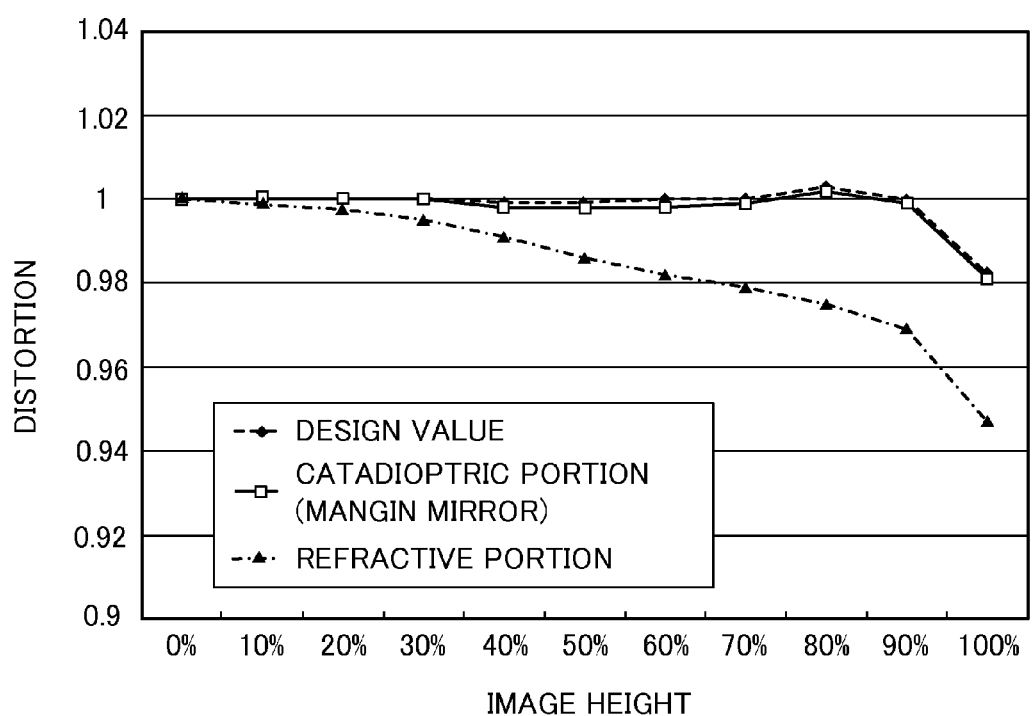
FIG. 3 is a diagram of illustrating a distortion at each image height in Embodiment 1 of the present invention.

The catadioptric optical system 104 includes a first imaging optical system G1 that includes a catadioptric optical system collecting a light beam from the object, and a second imaging optical system G2 that includes a refractive portion that receives a light beam from the first imaging optical system G1 to form an intermediate image and also to form an image of the intermediate image IM on an image plane. The first imaging optical system G1 includes a first optical element M1 that has a light transmissive portion at the periphery of an optical axis and that has a reflective portion (a backside reflective portion) by applying a reflective film onto a surface at an object side of a peripheral portion, and a second optical element M2 that has a light transmissive portion at the periphery of the optical axis and that has a reflective portion (a backside reflective portion) by applying a reflective film on a surface at an image side of the peripheral portion. Furthermore, the first imaging optical system G1 includes an aperture stop AS between the first optical element M1 and the second optical element M2. The catadioptric optical system 104 takes an image in an area of field of view having a diameter more than or equal to 3 mm. FIG. 1 is a schematic diagram of a main part of the image pickup apparatus of the present invention. FIG. 2 is a schematic diagram of a main part of the catadioptric optical system in Embodiment of the present invention. FIG. 3 is a diagram of describing a distortion with respect to NA on conditions that the aperture stop AS is arranged in the first imaging optical system G1 of Embodiment 1.

The aperture stop AS is typically arranged at the vicinity of a pupil, but the phenomenon that the pupil is distorted occurs because an optical paths of on-axis and off-axis light beams are extremely different in a catadioptric optical system with a high angle of view. The term of "the pupil is distorted" is defined as a ratio of the shift of off-axis NA with respect to on-axis NA.

Figure 4:
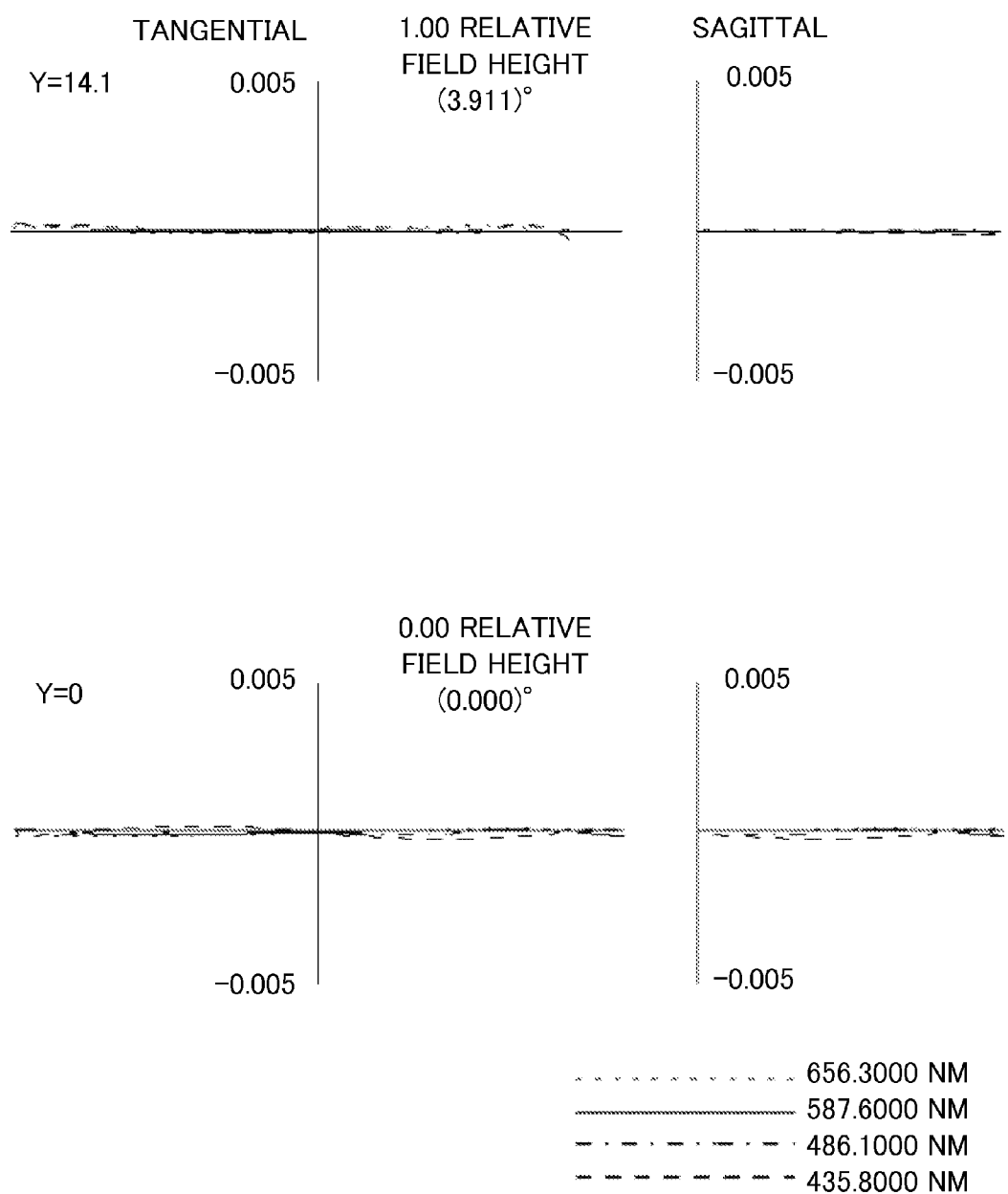
FIG. 4 is an aberration diagram of the catadioptric optical system in Embodiment 1 of the present invention.
Figure 5:
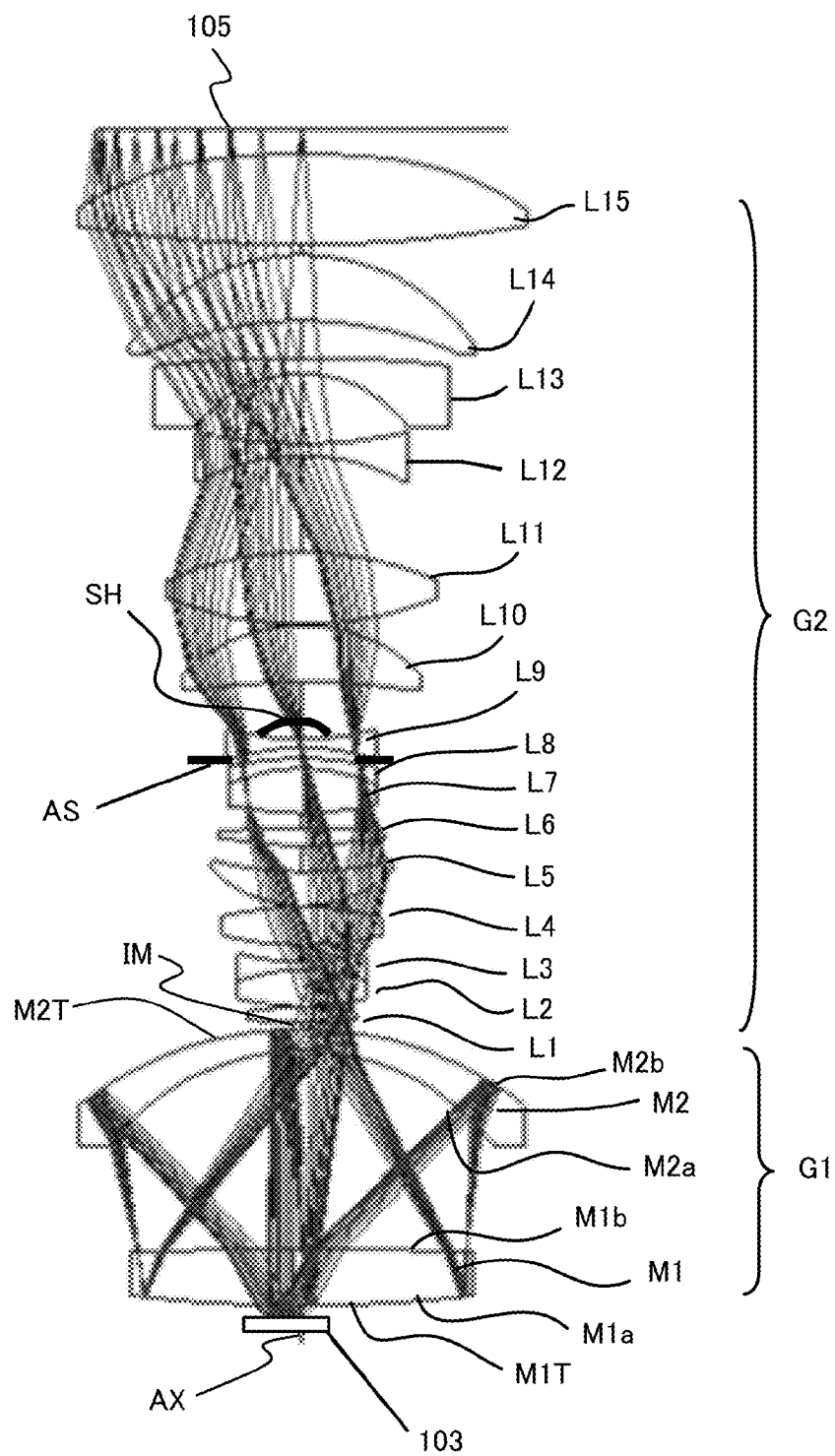
FIG. 5 is a schematic diagram of lenses in a case where an aperture stop is arranged in a second imaging optical system in Embodiment 1 of the present invention.

FIG. 4 is an aberration diagram of Embodiment 1. FIG. 5 is a schematic diagram of a main part in a situation where the aperture stop AS is disposed in the second imaging optical system G2 of Embodiment 1.

Hereinafter, referring to FIG. 1, a configuration of an image pickup apparatus 1000 that has the catadioptric optical system 104 of the present invention will be described. The image pickup apparatus 1000 collects light from the light source 101 using the illumination optical system 102 to illuminate uniformly the object 103 as a sample. Visible light, for example having a wavelength of 400 nm to 700 nm, is used as the light used in this time. The imaging optical system is configured by the catadioptric optical system 104 that has a reflective portion and a refractive portion that form an image of the object 103 on the image pickup element 105.

The data (image information) obtained by the image pickup element 105 is used to generate image data in the image processing system 106, and the generated image data is displayed on the display 107 or the like. In addition, it is stored in the storage unit 110. The image processing system 106 performs processings as usage, for example it corrects an aberration that has not been corrected by the catadioptric optical system 104 or connects image data that are obtained by different image pickup positions to be synthesized into one image data.

Lens components 112, 113, and 114 that are used for correcting aberrations and that are disposed inside the catadioptric optical system 104 are held by a holding mechanism (not shown) that includes a drive system (drive unit) 111 that moves each of the lens components along an optical axis. The lens component is configured by a single lens or a plurality of lenses. When the temperature of the catadioptric optical system 104 is changed due to the change of the temperature of the use environment or the like, the aberration change caused by the temperature change is rotationally symmetric around the optical axis. Therefore, the correction is performed by moving the lens components 112 to 114 along the optical axis.

In the embodiment, variations of various kinds of aberrations such as spherical aberration, coma aberration, or astigmatism is reduced by moving at least the three lens components along the optical axis in accordance with the temperature. As a result, a good image quality is obtained over the entire area of the wide field of view. Furthermore, since the aberration of the catadioptric optical system 104 is appropriately reduced, the calculation load of the image processing is reduced, and for example the processing of performing the aberration correction in the image processing system 106 is unnecessary.

The movement of the lens component for correction the aberration in an optical axis direction may be performed manually so that a user of a microscope can obtain a desired image quality while confirming the image data displayed on the display 107 or the like, or alternatively, it may be controlled based on an aberration correction flow that are previously set.

FIG. 2 is a cross-sectional diagram of a main part of the catadioptric optical system 104 in Embodiment 1 of the present invention. In FIG. 2, reference numeral 104 denotes a catadioptric optical system, and reference numeral 103 denotes an object plane as a sample. Reference numeral 105 denotes an image pickup element, which is disposed on an image plane. Reference sign AS denotes an aperture stop, and reference sign IM denotes an intermediate image. Reference sign AX denotes an optical axis of the catadioptric optical system 104. The catadioptric optical system 104 includes the aperture stop AS that collects a light beam from the object 103 and a first imaging optical system G1 including a reflective surface. The catadioptric optical system 104 also includes a second imaging optical system G2 that includes a refractive surface and a light shielding portion SH that receive the light beam from the first imaging optical system G1 to form an intermediate image and also to form an image of the intermediate image IM on the image pickup element 105.

The first imaging optical system G1 includes a first optical element (a Mangin mirror) M1, the aperture stop AS, and a second optical element (a Mangin mirror) M2, in order from an object side. The second imaging optical system G2 includes lens units G21 and G22, the light shielding art SH, and lens units G23 to G25, in order from the object side. The first optical element M1 of the first imaging optical system G1 has a surface at the side of the object 103 having a convex shape, and has a light transmissive portion M1T that has a positive refractive power on the periphery of the optical axis and that has a reflective portion that is provided by applying a reflective film to a surface M1a at the object side of the peripheral portion.

The second optical element M2 has a meniscus shape that points a concave surface at the object side, and has a light transmissive portion M2T that has a negative refractive power on the periphery of the optical axis and that has a reflective portion that is provided by applying a reflective film to a surface M2b at the image side of the peripheral portion. The first optical element M1 and the second optical element M2 are disposed so that the reflective portions M1a and M2b face each other. The second imaging optical system G2 is provided with a light shielding plate SH that is disposed near the lens unit G22 and that shields the light beam near the optical axis of light beams from the object 103 to prevent it from entering the image pickup element 105.

An aperture stop AS is disposed between the first optical element M1 and the second optical element M2 of the first imaging optical system G1 in each embodiment. A distance in the optical axis direction between the first optical element M1 and the aperture stop AS is denoted by t1. A distance in the optical axis direction between the aperture stop AS and the second optical element M2 is denoted by t2. A focal length of the first imaging optical system G1 is denoted by f1. In this case, the following Conditional expressions (1) and (2) are met:

$$0.00 < t1/f1 < 0.25 \quad (1)$$

$$2.3 < t2/t1 \quad (2)$$

Next, the technical sense of Conditional expressions (1) and (2) will be described. Conditional expression (1) relates to a distance in the optical axis direction between the first optical element M1 and the aperture stop AS.

When a value is over the upper limit of Conditional expression (1) and the aperture stop AS is too far from the first optical element M1, it is distant from a pupil of the first imaging optical system and an amount of distortion becomes large.

Alternatively, when a value is over the lower limit of Conditional expression (1) and the aperture stop AS is too close to the first optical element M1, t1=0 is met, i.e. the aperture stop AS contacts the first optical element M1, and therefore the condition of 0.00<t1/f1 is indispensable.

Conditional expression (2) relates to a balance of a position in a situation where the aperture stop AS is disposed between the first optical element M1 and the second optical element M2. When a value is over the lower limit of Conditional expression (2) and the aperture stop AS is too close to the first optical element M1, the amount of distortion becomes large.

In the catadioptric optical system 104 illustrated in FIG. 2, the light beam that is emitted from the object 103 illuminated by the light beam from the illumination optical system 102 passes through the light transmissive portion (central transmissive portion) M1T of the first optical element M1. After that, the light beam enters the refractive surface M2a of the second optical element M2, and then it is reflected on the reflective portion M2b and passes through the refractive surface M2a to enter the refractive surface M1b of the first optical element M1.

After that, it is reflected on the reflective portion Mia of the first optical element M1. Then, it passes through the refractive surface M1b and also passes through the light transmissive portion (central transmissive portion) M2T of the second optical element M2 to emit to the side of the second imaging optical system G2. Then, it forms the intermediate image IM of the sample 103 near a lens L1 of the lens unit G21 of the second imaging optical system G2. The lens L1 of the lens unit G21 functions as a field lens.

In the present embodiment, the configuration of the first imaging optical system G1 is not limited to this. For example, instead of the first and second optical elements M1 and M2 each of which is configured by a Mangin mirror, it may be configured by a combination of a surface reflection mirror that has a transmissive portion at a center portion and a lens.

Each of the reflective portion M1a of the first optical element M1 and the reflective portion M2b of the second optical element M2 that are contained in the first imaging optical system G1 has an aspherical shape. As a result, the generation of a chromatic aberration is suppressed and a spherical aberration is well corrected. Also, even in a high NA (an aperture ratio), various kinds of aberrations are appropriately reduced over a wide range of visible wavelength.

Each of the reflective portion M1a of the first optical element M1 and the reflective portion M2b of the second optical element M2 has a reflective surface having a positive refractive power. As a result, the increase of Petzval sum is reduced on conditions that the positive refractive power of the lens of the second imaging optical system G2 is strengthened and a total length of the optical system is shortened. This is because the effects on Petzval sum for a reflective surface and a refractive surface are opposite to each other.

The light from the first imaging optical system G1, in order, passes through the lens unit G21 (lenses L1 to L8) having a positive refractive power, the lens unit G22 (a lens L9) having a negative refractive power, the lens unit G23 (lenses L10 and L11) having a positive refractive power. Furthermore, the light passes through the lens unit G24 (lenses L12 and L13) having a negative refractive power, and the lens unit G25 (lenses L14 and L15) having a positive refractive power. Then, it magnifies and forms an image of the object 103 on the image pickup element 105 at 6-fold magnification.

Furthermore, when a surface of the lens L9 at the side of the object 103 is denoted by an Ra surface and a surface at the side of the image pickup element 105 is denoted by an Rb surface, the light shielding portion SH is disposed on the Rb surface of the lens L9. It prevents the light from the object 103 from passing through the central transmissive portions M1T and M2T of the first and second optical elements M1 and M2 to reach directly the image pickup element 105 without being reflected on the first optical element M1 and the second optical element M2.

(Embodiment 1)

In the catadioptric optical system 104 of Embodiment 1, the numerical aperture NA at the object side is 0.7, and the area of field of view has a diameter of 28.2 mm. A ratio of the hole in the pupil is suppressed to less than or equal to 30% as a ratio of its area. The object side is telecentric.

In the present embodiment, the worst value of the wavefront aberration by white light is suppressed to less than or equal to 20 mλrms. In an aberration diagram of FIG. 4, the aberration diagram of an on-axis object height (Y=0 mm) and the most off-axis object height (Y=14.1 mm) is illustrated. In Embodiment 1, the aberrations are appropriately suppressed for the wavelengths of 656.3 nm, 587.6 nm, 486.1 nm, and 435.8 nm. The sample 103 has a diameter of 3 mm to 30 mm.

Figure 7:
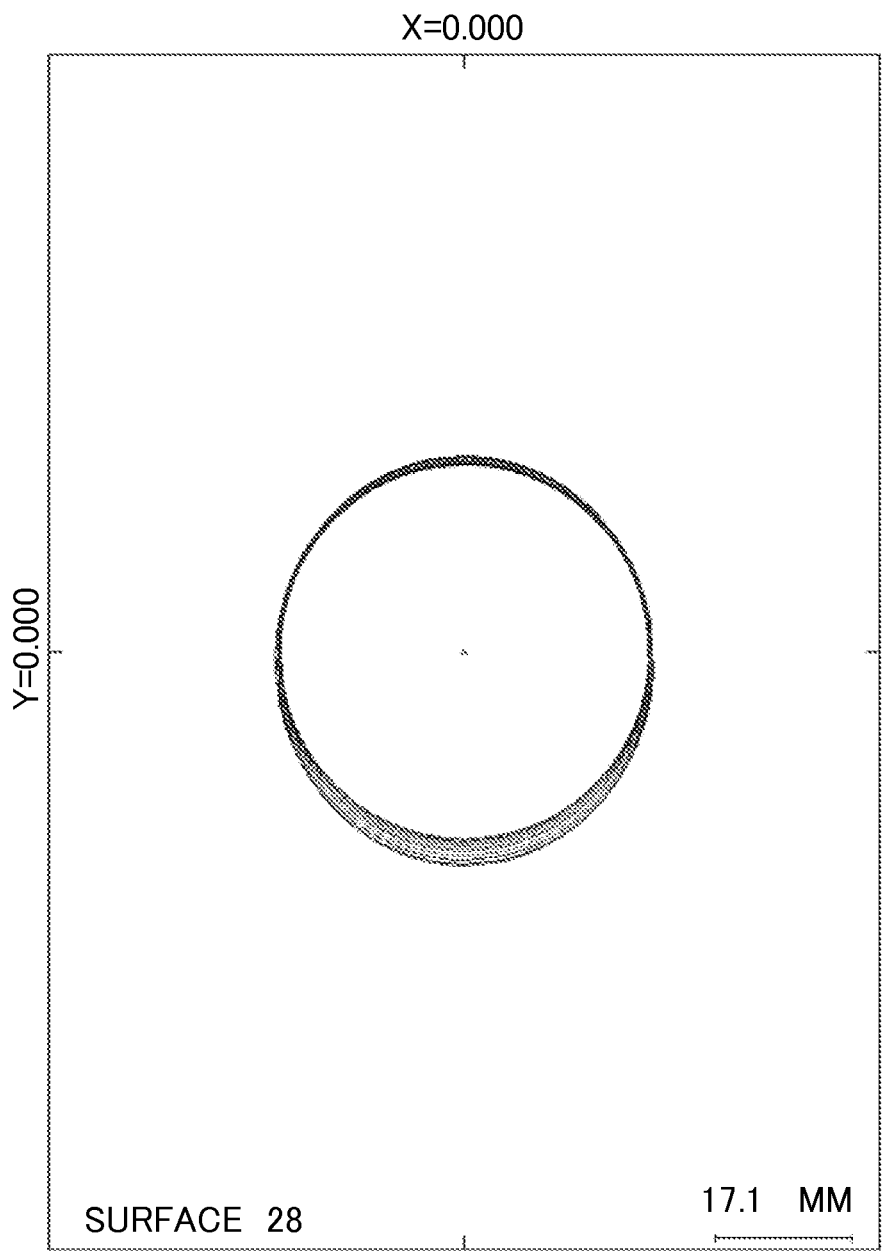
FIG. 7 is a diagram of describing a shape of a light beam at a position of the aperture stop in the catadioptric optical system illustrated in FIG. 5.

FIG. 5 is a diagram of an optical path in a situation where a position of the aperture stop (AS) is disposed in the second imaging optical system G2 when using the same lens configuration as the catadioptric optical system illustrated in FIG. 2. When the aperture stop AS is disposed at a position illustrated in FIG. 5, the shapes of the light beams of the aperture stop AS are extremely different each other between on-axis and off-axis as illustrated in FIG. 7. This is called distortion, and if a diameter of the aperture stop is determined in an on-axis set NA, the vignetting of the off-axis ray occurs and it influences on the resolution and the light intensity and therefore it causes the deterioration of the optical performance.

Figure 6:
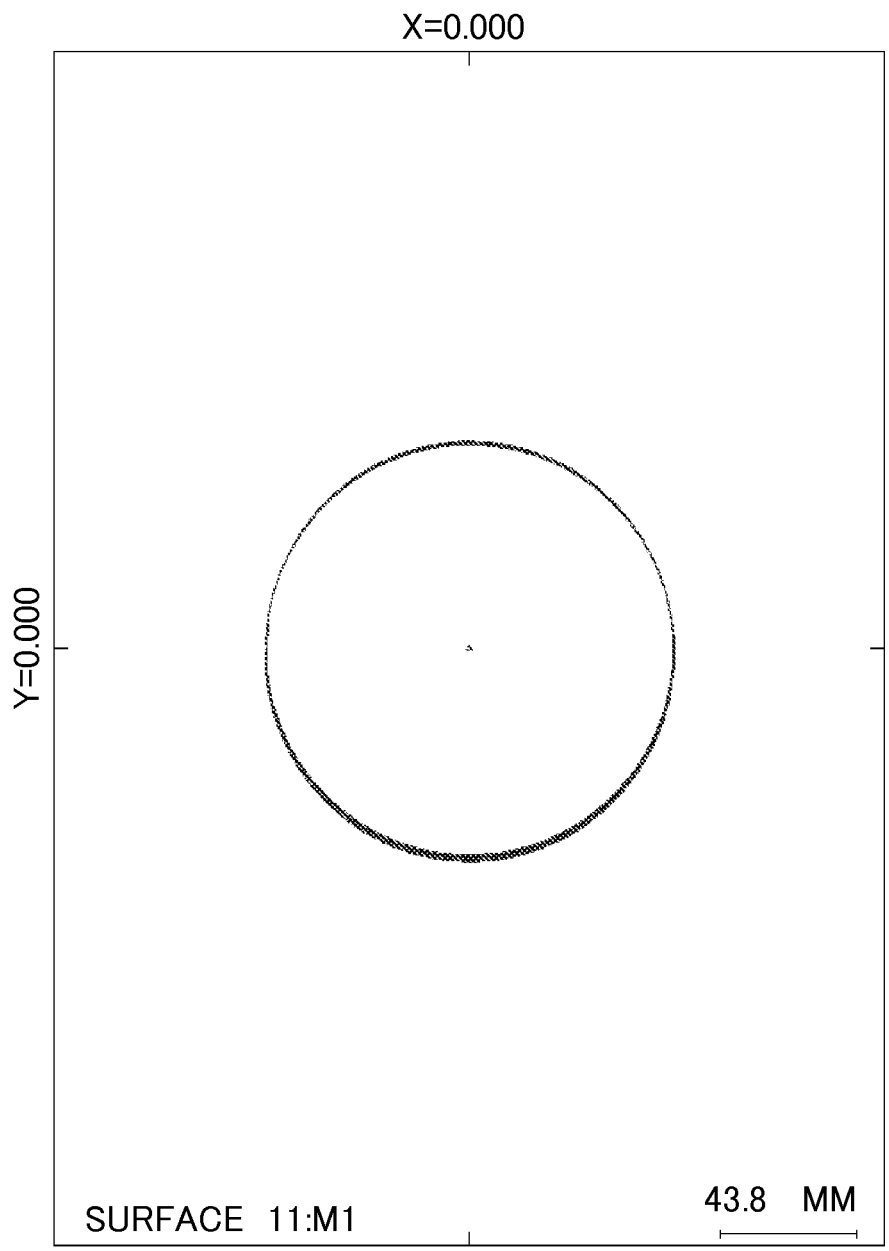
FIG. 6 is a diagram of describing a shape of a light beam at a position of the aperture stop in the catadioptric optical system illustrated in FIG. 2.

FIG. 3 illustrates a ratio of the distortion in this case. FIG. 3 illustrates an image height for the lateral axis and an amount of distortion for the vertical axis. When the aperture stop AS is disposed at the refractive portion of the second imaging optical system G2, the amount of distortion increases as the image height increases, and the distortion of around 5% occurs in 100% image height. Compared to this, when the aperture stop AS is disposed in the first imaging optical system G1, the amount of distortion is substantially the same as a design value even if the image height increases. The shape of the light beam of the aperture stop AS is illustrated in FIG. 6. There is little position shift between the on-axis ray and the off-axis ray.

In the present embodiment, the position of the aperture stop AS is near the first optical element M1 as illustrated in FIG. 2 and it is within 20 mm distant from the surface M1b of the convex lens M1. In Embodiment 1, f1=89.2, t1=8, t2=73.57, t1/f1=0.09, and t2/t1=9.2 are met.

When the amount of distortion increases, it influences on the light intensity or the resolution and therefore the optical performance is deteriorated, but it is easy to prevent it by placing the aperture stop AS at a position which meets Conditional expression (1) of the first imaging optical system G1.

In the present embodiment, a catadioptric optical system that prevents the deterioration of the optical performance and that has a high resolution over a wide area to appropriately correct the aberration over the entire area of visible light is achieved.

(Embodiment 2)

Next, Embodiment 2 of the present invention will be described. Embodiment 2 illustrated in FIG. 8 has substantially the same lens configuration as that of Embodiment 1 of FIG. 2.

Figure 9:
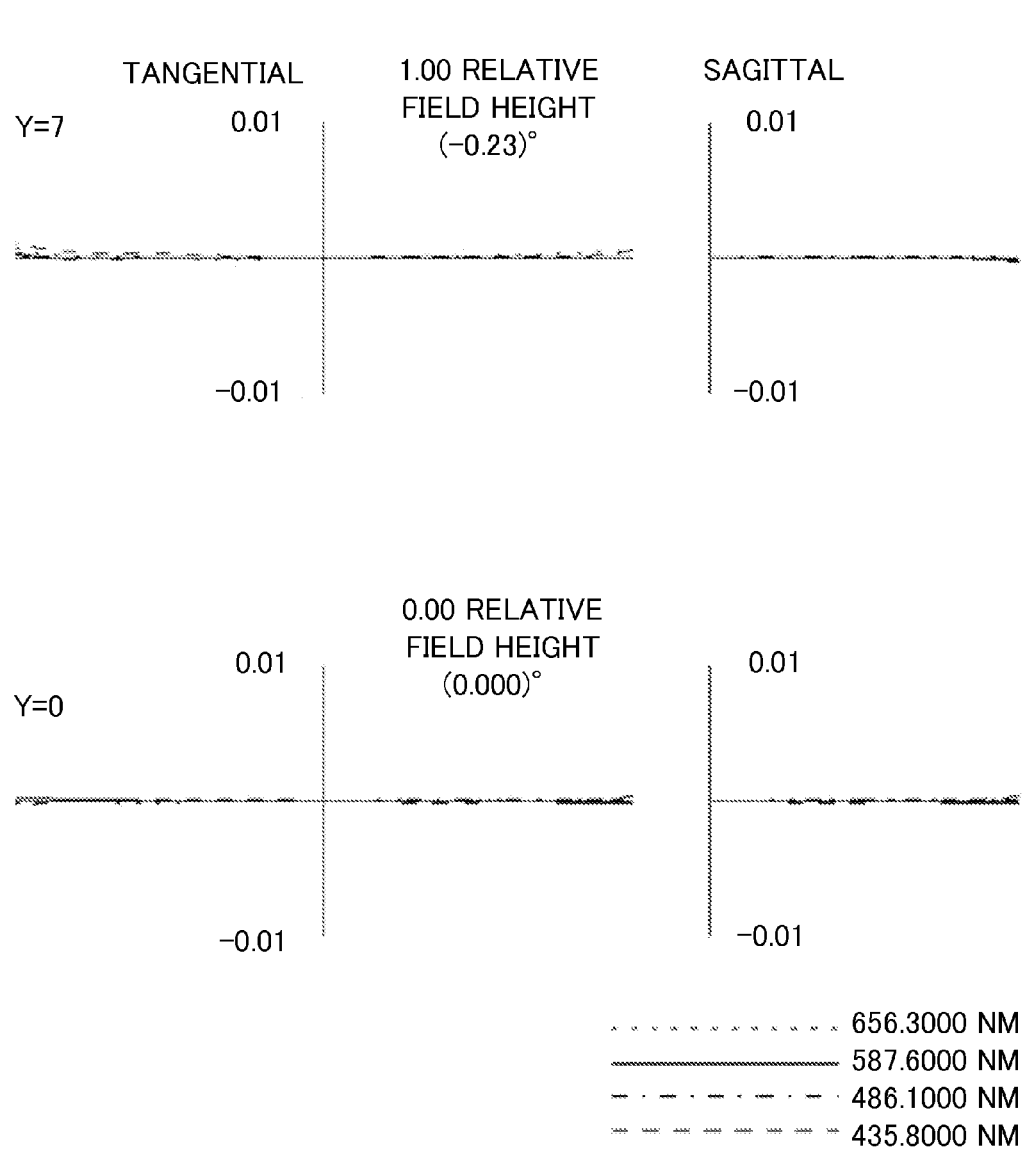
FIG. 9 is an aberration diagram of the catadioptric optical system in Embodiment 2 of the present invention.

In the catadioptric optical system of Embodiment 2, the numerical aperture NA at the object side is 0.7, and the magnification is 10 times. The object side is telecentric. The ratio of the hole in the pupil is suppressed to less than or equal to 30% as a ratio of its area. The worst value of the wavefront aberration by white light is suppressed to less than or equal to 20 mλrms. FIG. 9 illustrates an aberration diagram in the present embodiment.

In the aberration diagram of FIG. 9, the aberration diagram of an on-axis object height (Y=0 mm) and the most off-axis object height (Y=7 mm) is illustrated. In Embodiment 2, the aberrations are appropriately suppressed for each of wavelengths of 656.3 nm, 587.6 nm, 486.1 nm, and 435.8 nm. The sample 103 has a diameter of 3 mm to 30 mm.

Figure 10:
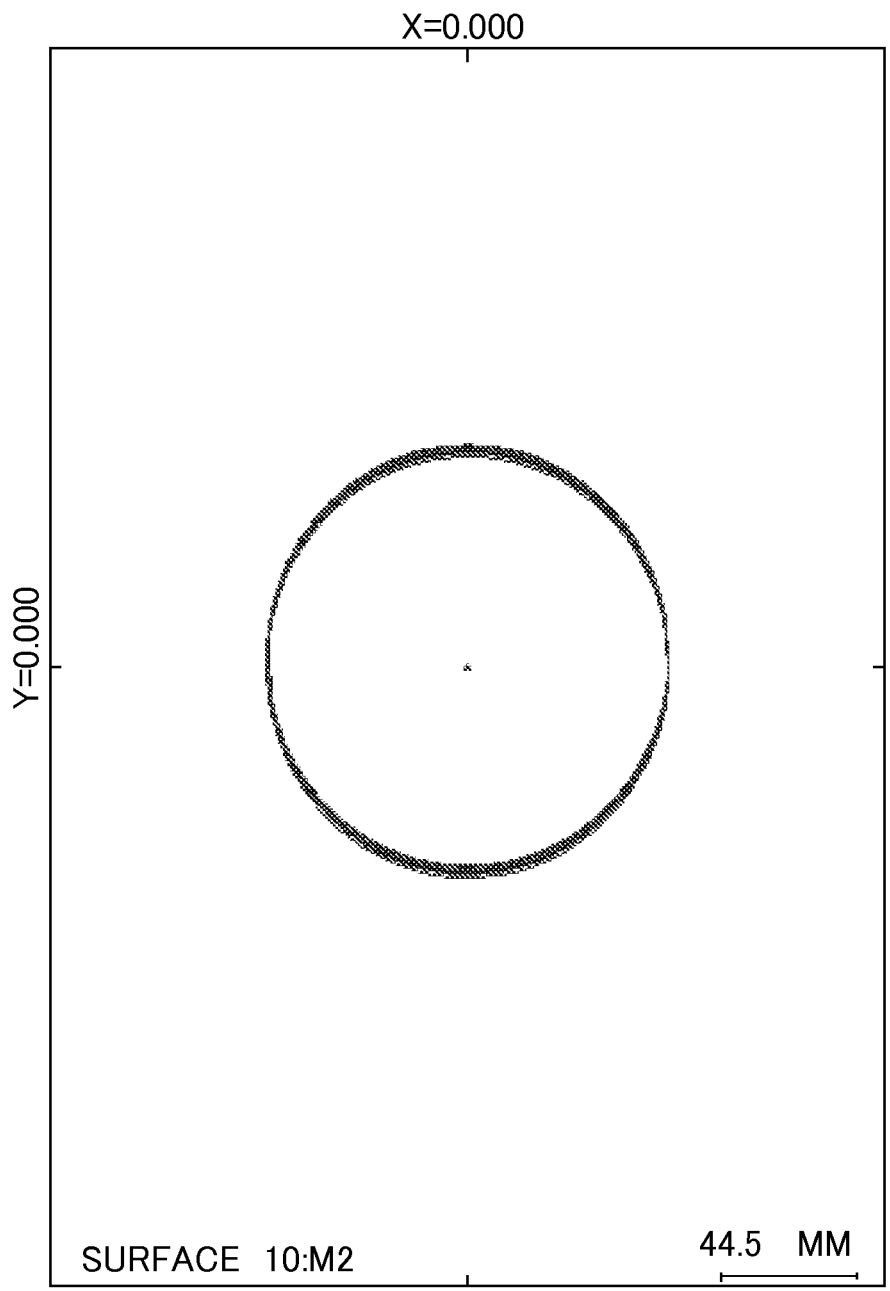
FIG. 10 is a schematic diagram of a shape of a light beam at a position of the aperture stop in the catadioptric optical system illustrated in FIG. 8.

When the aperture stop AS is disposed in the first imaging optical system G1 in Embodiment 2, the amount of distortion is less than or equal to 1%. The FIG. 10 illustrates a shape of the light beam of the aperture stop AS in the present embodiment.

Figure 8:
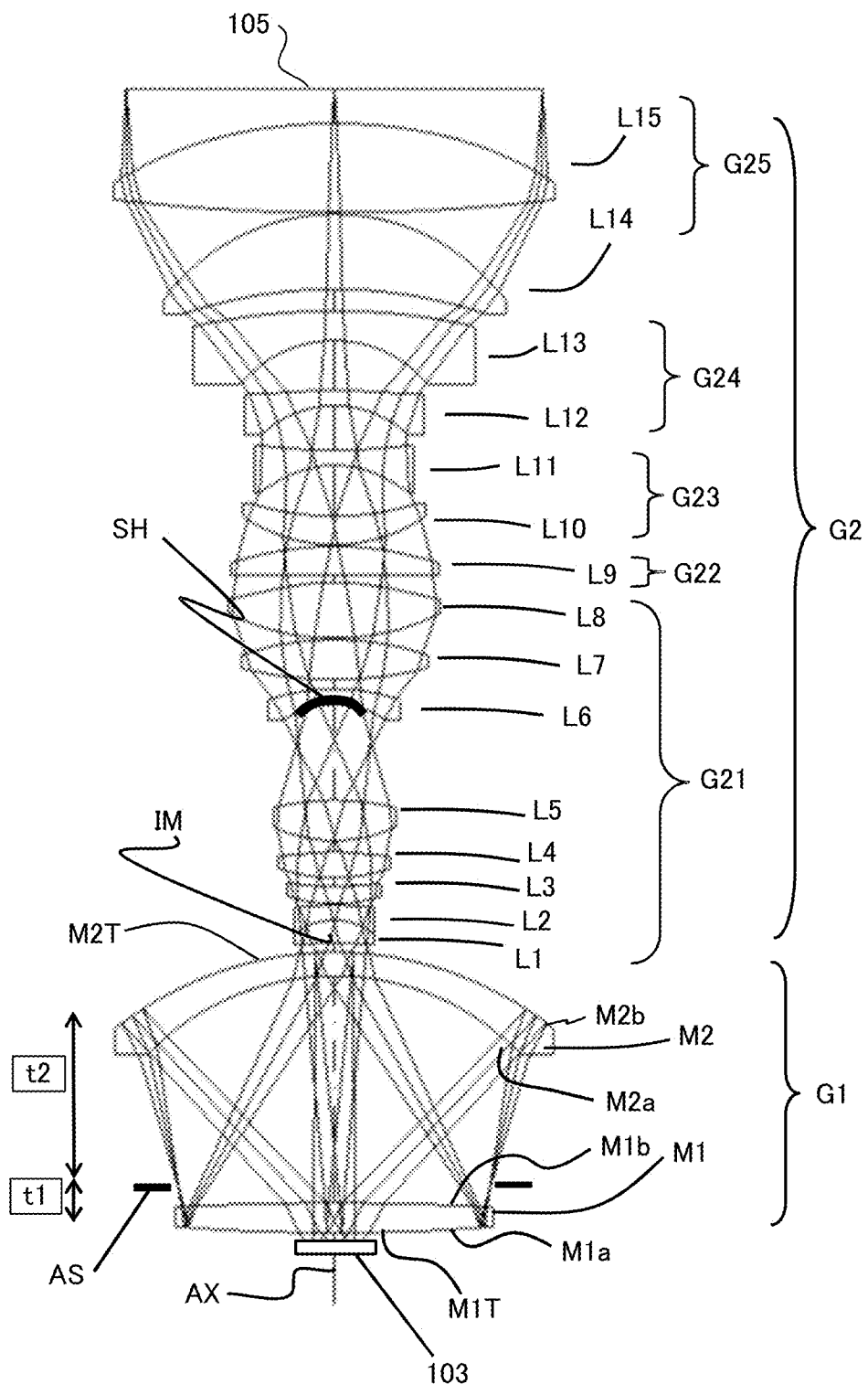
FIG. 8 is a schematic diagram of lenses of a catadioptric optical system in Embodiment 2 of the present invention.

The position of the aperture stop AS is near the first optical element M1 as illustrated in FIG. 8 and it is within 20 mm distant from the surface M1b of the first optical element M1. In the catadioptric optical system of Embodiment 2, f1=108, t1=13, t2=57.9, t1/f1=0.12, and t2/t1=4.5 are met.

Numerical examples of Embodiment 1 and Embodiment 2 will be described as follows. The surface number denotes an order of an optical surface that is counted from an object plane (a sample surface) to an image plane. Symbol r denotes a radius of curvature of an i-th optical surface. Symbol d denotes an interval between the i-th optical surface and (i+1) th optical surface, and the sign indicates a positive when the measurement is performed from the object side to the image side, i.e. the direction in which the light travels, and it indicates a negative when the direction is the opposite. Symbols Nd and νd denote a refractive index of the material and the Abbe number with respect to a wavelength of 587.6 nm, respectively. The aspherical shape is represented by an expression of a general aspherical surface that is indicated by the following expression.

In the following expression, symbol Z denotes a coordinate in the optical axis direction, symbol c denotes a radius of curvature (the inverse of the radius of curvature r), symbol h denotes a height from the optical axis, symbol k denotes a conic constant, and symbols A, B, C, D, E, F, G, H, J, . . . denote aspherical surface coefficients of 4th, 6th, 8th, 10th, 12th, 14th, 16th, 18th, 20th, . . . , respectively.

$$Z = \frac{ch^2}{1 + \sqrt{(1+k)c^2h^2}} + Ah^4 + Bh^6 + Ch^8 + Dh^{10} + Eh^{12} + Fh^{14} + Gh^{16} + Hh^{18} + Jh^{20} + \ldots$$

Symbol "E-X" means "$10^{-x}$". Table 1 indicates a relationship between each conditional expression described above and numerical examples.

NUMERICAL EXAMPLE 1

| Surface number | r | d | Nd | νd |
|---|---|---|---|---|
| Object plane | | 3.00 | | |
| 1 | 783.74 | 28.01 | 1.49 | 70.24 |
| 2 | −797.06 | 81.57 | | |
| 3 | −102.12 | 7.77 | 1.52 | 64.14 |
| 4 | −140.83 | −7.77 | 1.52 | 64.14 |
| 5 | −102.12 | −81.57 | | |

-continued

| | | | | |
|---|---|---|---|---|
| 6 | −797.06 | −28.01 | 1.49 | 70.24 |
| 7 | 783.74 | 28.01 | 1.49 | 70.24 |
| 8 | −797.06 | 81.57 | | |
| 9 | −102.12 | 7.77 | 1.52 | 64.14 |
| 10 | −140.83 | 3.49 | | |
| 11 | −154.32 | 7.05 | 1.64 | 55.38 |
| 12 | −72.36 | 0.50 | | |
| 13 | 63.71 | 17.64 | 1.44 | 94.95 |
| 14 | −50.65 | 5.00 | 1.67 | 38.15 |
| 15 | 531.40 | 7.25 | | |
| 16 | 134.93 | 13.56 | 1.70 | 48.52 |
| 17 | −176.29 | 0.50 | | |
| 18 | 54.79 | 12.36 | 1.60 | 65.44 |
| 19 | 118.83 | 14.42 | | |
| 20 | 234.49 | 11.45 | 1.75 | 35.28 |
| 21 | −144.57 | 3.61 | | |
| 22 | 99.73 | 17.43 | 1.60 | 65.44 |
| 23 | −54.76 | 5.00 | 1.67 | 38.15 |
| 24 | −392.90 | 1.00 | | |
| 25 | 0.00 (Light shielding portion) | 3.84 | | |
| 26 | −82.47 | 5.00 | 1.61 | 43.71 |
| 27 | 106.23 | 26.38 | | |
| 28 | −475.21 | 23.33 | 1.72 | 43.69 |
| 29 | −65.34 | 0.50 | | |
| 30 | 136.04 | 26.85 | 1.49 | 70.24 |
| 31 | −132.13 | 44.13 | | |
| 32 | −86.09 | 5.00 | 1.74 | 32.26 |
| 33 | 175.53 | 29.93 | | |
| 34 | −56.65 | 5.00 | 1.49 | 70.24 |
| 35 | −1735.21 | 11.41 | | |
| 36 | −183.59 | 29.63 | 1.76 | 40.10 |
| 37 | −85.12 | 6.37 | | |
| 38 | 456.98 | 31.46 | 1.68 | 50.72 |
| 39 | −468.94 | 10.50 | | |
| Image plane | 0 | | | |

Aspherical coefficient of Numerical example 1
(Aspherical coefficient)

| Surface number | k<br>E | A<br>F | B<br>G | C<br>H | D<br>J |
|---|---|---|---|---|---|
| 1, 7 | 0.00E+00<br>−9.72E−25 | 1.67E−09<br>1.54E−28 | 3.09E−13<br>−7.54E−33 | 3.96E−17<br>0.00E+00 | 3.63E−21<br>0.00E+00 |
| 4, 10 | 0.00E+00<br>1.53E−25 | 7.26E−09<br>−8.73E−30 | 4.06E−13<br>6.74E−34 | 2.43E−17<br>0.00E+00 | 2.13E−22<br>0.00E+00 |
| 13 | 0.00E+00<br>−6.07E−18 | −6.61E−07<br>4.64E−21 | 3.61E−10<br>−1.49E−24 | −1.77E−12<br>0.00E+00 | 4.28E−15<br>0.00E+00 |
| 19 | 0.00E+00<br>−1.34E−19 | 1.06E−06<br>8.62E−23 | 1.26E−10<br>−2.47E−26 | −3.89E−14<br>0.00E+00 | 1.21E−16<br>0.00E+00 |
| 20 | 0.00E+00<br>−6.10E−20 | −2.24E−07<br>4.21E−23 | −2.10E−10<br>−1.52E−26 | 7.61E−14<br>0.00E+00 | 2.93E−17<br>0.00E+00 |
| 22 | 0.00E+00<br>−2.82E−19 | −3.39E−07<br>2.37E−22 | 1.40E−10<br>−7.09E−26 | −1.22E−13<br>0.00E+00 | 1.12E−16<br>0.00E+00 |
| 27 | 0.00E+00<br>−9.05E−19 | −8.37E−07<br>5.49E−22 | 4.38E−10<br>−1.47E−25 | −6.29E−13<br>0.00E+00 | 8.80E−16<br>0.00E+00 |
| 28 | 0.00E+00<br>−1.39E−21 | −5.75E−07<br>1.53E−25 | 6.56E−11<br>−2.07E−29 | −8.58E−15<br>0.00E+00 | 2.98E−18<br>0.00E+00 |
| 31 | 0.00E+00<br>−3.12E−22 | −2.68E−07<br>4.81E−26 | 3.68E−11<br>−1.39E−30 | 1.85E−15<br>0.00E+00 | 1.56E−19<br>0.00E+00 |
| 32 | 0.00E+00<br>3.66E−21 | −1.11E−06<br>−2.08E−24 | 1.65E−10<br>4.09E−28 | 1.46E−15<br>0.00E+00 | −1.61E−17<br>0.00E+00 |
| 35 | 0.00E+00<br>−2.37E−21 | −7.37E−07<br>2.68E−25 | 2.14E−10<br>−1.43E−29 | −5.75E−14<br>0.00E+00 | 1.31E−17<br>0.00E+00 |
| 39 | 0.00E+00<br>−1.62E−22 | −2.14E−07<br>8.95E−27 | 3.18E−11<br>−2.10E−31 | −8.94E−15<br>0.00E+00 | 1.60E−18<br>0.00E+00 |

NUMERICAL EXAMPLE 2

| Object plane | | r | d | ND | νd |
|---|---|---|---|---|---|
| 1 | Aspherical | 642.4 | 9.4 | 1.52 | 64.14 |
| 2 | Spherical | −1525.2 | 70.9 | | |
| 3 | Spherical | −85.3 | 7.2 | 1.52 | 64.14 |
| 4 | Aspherical | −115.3 | −7.2 | 1.52 | 64.14 |
| 5 | Spherical | −85.3 | −70.9 | | |
| 6 | Spherical | −1527.6 | −9.4 | 1.52 | 64.14 |
| 7 | Aspherical | 642.4 | 9.4 | 1.52 | 64.14 |
| 8 | Spherical | −1525.2 | 70.9 | | |
| 9 | Spherical | −85.3 | 7.2 | 1.52 | 64.14 |
| 10 | Aspherical | −115.3 | 3.0 | | |
| 11 | Aspherical | −106.2 | 8.6 | 1.64 | 55.38 |
| 12 | Spherical | −23.6 | 5.0 | 1.74 | 29.30 |
| 13 | Spherical | −52.4 | 2.5 | | |
| 14 | Aspherical | 47.4 | 8.2 | 1.61 | 60.69 |
| 15 | Spherical | −60.3 | 9.9 | | |
| 16 | Spherical | 45.1 | 9.4 | 1.54 | 55.43 |
| 17 | Spherical | −89.1 | 3.2 | | |
| 18 | Spherical | −126.3 | 6.9 | 1.75 | 30.11 |
| 19 | Aspherical | −41.8 | 6.7 | | |
| 20 | Spherical | −24.2 | 7.4 | 1.65 | 33.10 |
| 21 | Aspherical | −149.0 | 6.9 | | |
| 22 | Spherical | 1.00E+18 | 6.8 | 1.50 | 59.58 |
| 23 | Spherical | 1.00E+18 | 0.0 | | |
| 24 | Spherical | 97.4 | 9.5 | 1.71 | 47.49 |
| 25 | Aspherical | −554.5 | 0.9 | | |
| 26 | Spherical | 110.1 | 14.2 | 1.61 | 60.52 |
| 27 | Aspherical | −58.2 | 0.5 | | |
| 28 | Spherical | 43.8 | 8.8 | 1.75 | 31.34 |
| 29 | Spherical | 60.1 | 8.2 | | |
| 30 | Aspherical | 58.2 | 7.3 | 1.74 | 35.95 |
| 31 | Spherical | 46.4 | 27.3 | | |
| 32 | Spherical | −27.3 | 5.6 | 1.74 | 35.95 |
| 33 | Aspherical | 793.1 | 17.6 | | |
| 34 | Aspherical | −39.1 | 6.7 | 1.49 | 68.89 |
| 35 | Spherical | −147.5 | 10.9 | | |
| 36 | Spherical | −77.8 | 14.6 | 1.74 | 44.85 |
| 37 | Aspherical | −60.9 | 0.7 | | |
| 38 | Spherical | −134.1 | 20.2 | 1.74 | 44.85 |
| 39 | Spherical | −73.7 | 0.5 | | |
| 40 | Spherical | 1474.7 | 18.7 | 1.74 | 37.55 |
| 41 | Aspherical | −263.7 | 1.5 | | |
| Image plane | | | | | |

| Surface number | k<br>E | A<br>F | B<br>G | C<br>H | D<br>J |
|---|---|---|---|---|---|
| 1, 7 | 0.00E+00 | 1.84E−08 | −7.14E−13 | −7.14E−13 | 1.27E−19 |
|  | −5.77E−23 | 1.31E−26 | −1.19E−30 | 0.00E+00 | 0.00E+00 |
| 4, 10 | 0.00E+00 | 1.47E−08 | 1.37E−12 | 1.07E−16 | 4.38E−21 |
|  | 1.80E−24 | −1.67E−28 | 2.11E−32 | 0.00E+00 | 0.00E+00 |
| 11 | 0.00E+00 | −5.87E−06 | 8.08E−09 | 8.05E−12 | 3.85E−14 |
|  | 9.03E−26 | −1.57E−32 | 0.00E+00 | 0.00E+00 | 0.00E+00 |
| 14 | 0.00E+00 | −4.04E−06 | −7.89E−09 | 1.77E−11 | −4.83E−14 |
|  | −5.88E−24 | −2.12E−27 | 0.00E+00 | 0.00E+00 | 0.00E+00 |
| 19 | 0.00E+00 | 2.57E−07 | −5.28E−10 | 5.16E−12 | −7.30E−15 |
|  | −2.69E−18 | 0.00E+00 | 0.00E+00 | 0.00E+00 | 0.00E+00 |
| 21 | 0.00E+00 | −8.47E−06 | 2.05E−09 | −5.43E−12 | 8.12E−15 |
|  | −8.82E−18 | −9.75E−30 | 0.00E+00 | 0.00E+00 | 0.00E+00 |
| 25 | 0.00E+00 | −8.16E−07 | 5.19E−10 | −1.81E−12 | 2.14E−15 |
|  | −7.44E−19 | −7.83E−24 | 0.00E+00 | 0.00E+00 | 0.00E+00 |
| 27 | 0.00E+00 | 3.63E−06 | −1.07E−09 | 1.64E−12 | −1.60E−15 |
|  | 6.70E−19 | −8.25E−23 | 0.00E+00 | 0.00E+00 | 0.00E+00 |
| 30 | 0.00E+00 | −2.80E−08 | −4.09E−09 | 4.05E−12 | −4.18E−15 |
|  | 3.21E−18 | −5.72E−24 | 0.00E+00 | 0.00E+00 | 0.00E+00 |
| 33 | 0.00E+00 | 5.46E−06 | −6.07E−09 | 8.19E−13 | 2.08E−15 |
|  | −3.65E−19 | −6.71E−22 | 0.00E+00 | 0.00E+00 | 0.00E+00 |
| 34 | 0.00E+00 | 6.51E−06 | −1.13E−09 | 1.19E−12 | −7.85E−17 |
|  | −5.25E−19 | 4.61E−22 | 0.00E+00 | 0.00E+00 | 0.00E+00 |
| 37 | 0.00E+00 | 1.23E−06 | −3.10E−10 | 8.66E−14 | 2.17E−18 |
|  | −2.43E−21 | −4.59E−25 | 4.48E−28 | 0.00E+00 | 0.00E+00 |
| 41 | 0.00E+00 | −6.20E−07 | 2.51E−10 | −7.51E−14 | 1.44E−17 |
|  | −1.72E−21 | 1.04E−25 | −1.76E−30 | 0.00E+00 | 0.00E+00 |

TABLE 1

| Conditional expressions | Examples | |
|---|---|---|
| | 1 | 2 |
| (1) t1/f1 | 0.09 | 0.12 |
| (2) t2/t1 | 9.19 | 4.45 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-165389, filed on Jul. 28, 2011, which is hereby incorporated by reference herein in its entirety.

What is claimed is:

1. A catadioptric optical system comprising:
    an aperture stop;
    a first imaging optical system configured to collect a light beam from an object and to form an intermediate image of the object; and
    a second imaging optical system configured to project the intermediate image on an image plane,
    wherein the first imaging optical system includes a first optical element that has a light transmissive portion provided on a periphery of an optical axis and a reflective portion provided on a surface at an object side, and a second optical element that has a light transmissive portion provided on the periphery of the optical axis and a reflective portion provided on a surface at an image side,
    wherein the light beam from the object emits to the second imaging optical system after passing through, in order, the light transmissive portion of the first optical element, the reflective portion of the second optical element, the reflective portion of the first optical element, and the light transmissive portion of the second optical element, and
    wherein the aperture stop is disposed between the first optical element and the second optical element.

2. The catadioptric optical system according to claim 1, wherein the following condition is met:

$$2.3 < t2/t1,$$

where t1 is a distance between the first optical element and the aperture stop on the optical axis, and t2 is a distance between the aperture stop and the second optical element on the optical axis.

3. The catadioptric optical system according to claim 2, wherein the following condition is met:

$$0.00 < t1/f1 < 0.25,$$

where f1 is a focal length of the first imaging optical system.

4. The catadioptric optical system according to claim 1, wherein the surface at the object side of the first optical element has a convex meniscus shape, and the surface at the object side of the second optical element has a concave meniscus shape.

5. The catadioptric optical system according to claim 1, wherein the reflective portion of each of the first and second optical elements has an aspherical shape.

6. The catadioptric optical system according to claim 1, wherein the second imaging optical system has a light shielding portion for shielding a light beam from the object that passes through the light transmissive portions of the first and second optical elements without passing through the reflective portions of the first and second optical elements.

7. An image pickup apparatus comprising:
    a catadioptric optical system and
    an image pickup element configured to perform a photoelectric conversion of an image of an object formed by the catadioptric optical system,
    wherein the catadioptric optical system comprises:
    an aperture stop;
    a first imaging optical system configured to collect a light beam from the object and form an intermediate image of the object; and
    a second imaging optical system configured to project the intermediate image on an image plane,
    wherein the first imaging optical system includes a first optical element that has a light transmissive portion provided on a periphery of an optical axis and a reflective portion provided on a surface at an object side, and a second optical element that has a light transmissive portion provided on the periphery of the optical axis and a reflective portion provided on a surface at an image side,
    wherein the light beam from the object emits to the second imaging optical system after passing through, in order, the light transmissive portion of the first optical element, the reflective portion of the second optical element, the reflective portion of the first optical element, and the light transmissive portion of the second optical element, and
    wherein the aperture stop is disposed between the first optical element and the second optical element.

8. The image pickup apparatus according to claim 7, wherein the catadioptric optical system includes:
    a lens component configured to correct an aberration; and
    a drive unit configured to move the lens component along the optical axis.

9. The image pickup apparatus according to claim 8, wherein the drive unit reduces variation of an aberration of the catadioptric optical system by moving the lens component in accordance with an environmental temperature.

10. The image pickup apparatus according to claim 7, further comprising an image processing system that generates image information based on data obtained from the image pickup element.

11. The image pickup apparatus according to claim 10, further comprising a display device that displays the image information.

* * * * *